(12) United States Patent
Tada et al.

(10) Patent No.: US 6,522,605 B1
(45) Date of Patent: Feb. 18, 2003

(54) DISK APPARATUS FOR FOCUSING AND ADJUSTING A LASER BEAM

(75) Inventors: Koichi Tada, Gifu (JP); Takashi Onaka, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 241 days.

(21) Appl. No.: 09/650,640

(22) Filed: Aug. 30, 2000

(30) Foreign Application Priority Data

Aug. 30, 1999 (JP) .......................................... 11-242659

(51) Int. Cl.[7] ................................................. G11B 7/00
(52) U.S. Cl. .................................. 369/44.26; 369/44.29
(58) Field of Search ........................... 369/44.25, 44.26, 369/44.29, 53.29

(56) References Cited

U.S. PATENT DOCUMENTS 6,407,968 B1 * 6/2000 Nakata et al. ............ 369/44.26
6,091,678 A * 7/2000 Fushimi et al. .......... 369/44.26
6,240,055 B1 * 5/2001 Takamine et al. ........ 369/44.26

FOREIGN PATENT DOCUMENTS

JP          08-7300        1/1996

* cited by examiner

Primary Examiner—Nabil Hindi
(74) Attorney, Agent, or Firm—Armstrong, Westerman & Hattori, LLP

(57) ABSTRACT

A disk apparatus includes a DSP core. When turning on power to the apparatus main body or exchanging the MO disk, setting processing of focus offset (offset) values is performed. The DSP core extracts fine clock mark (FCM) signals out of the reproduced signal through tracking on the land/groove. Specifically, in a range that mean value of FCM signal levels is equal to or greater than a predetermined level, FCM signal levels are detected at positions shifted left and right by a predetermined amount from a present offset value. In this manner, scanning is made throughout the range while being shifted by a predetermined amount, each time of which a difference is detected. An offset value where the difference assumes a minimum is determined as an optimal offset value. The optimal offset values are determined respectively for the land and the groove, which are switched according to a track (land/groove) upon reproduction.

4 Claims, 9 Drawing Sheets

DISK APPARATUS FOR FOCUSING AND ADJUSTING A LASER BEAM

BACKGROUND OF THE INVENTION

1. Field of the Invention

This invention relates generally to disk apparatuses and, more particularly, to a disk apparatus for reproducing information out of a disk having record at lands/grooves, such as an ASMO (Advanced-Storage Magneto-Optical) disk.

2. Description of the Prior Art

In the conventional disk apparatus of this kind such as DVD or CD, the optical pickup is corrected for focus-offset deviation by adjusting the focus offset in a manner maximizing the RF signal or minimizing jitter in the RF signal.

Meanwhile, there is disclosed as one example a conventional disk apparatus of this kind in Japanese Patent Laid-Open No. H8-7300 [G11B 7/09, G11B 7/007] laid open on Jan. 12, 1996. In this focus offset adjusting device, an offset amount is detected from a reproduced-signal envelope voltage in positive and negative sections of a wobbling signal, thereby outputting offset voltage to correct deviation in the focus offset. This offset voltage is added to the focus error signal, thereby automatically adjusting the focus offset.

However, in the former case, where an ASMO disk is used, no RF signals are recorded thereon. Consequently, focus balance adjustment is impossible to perform in correcting focus-offset deviation. In the latter case, because the envelope voltage is sampled using the reproduced signals from the VFO region, focus balance adjustment can be implemented for only the disk having record at the land.

SUMMARY OF THE INVENTION

Therefore, it is a primary object of the present invention to provide a disk apparatus capable of setting focus offset values optimal for the respective land and groove.

The present invention is a disk apparatus for reproducing information out of a disk having record at lands/grooves, comprising: an extractor for illuminating and converging laser light to the disk and extracting fine clock mark signals out of laser light reflected upon the disk; and a setter for setting focus offset values optimal for the land and the groove based on mean values of the fine clock mark signals.

This disk apparatus can reproduce information from a disk having record at lands/grooves. For example, the laser light emitted from the laser diode is converged and illuminated onto a reproducing surface of the disk. The light reflects upon the disk reproducing surface and turns into reflection light from which fine clock mark signals (FCM signals) are to be extracted. Based on a mean value in level of the FCM signals, the setting means sets an optimal focus offset value. The setter provides setting of optimal focus offset signals respectively for the land and the groove. When reproducing with the disk, focus offset values may be switched that have been respectively set depending on a track (land/groove).

According to the invention, optimal focus offset values can be set respectively for the land and the groove, thus providing an optimal reproduced signal.

In one aspect of the invention, the setter detects FCM signal levels for focus offset in positions shifted left and right (plus and minus) by a predetermined amount from a present focus offset value. Then, the difference detector detects a difference between the detected two FCM signal levels. That is, it is possible to determine based on the difference whether the present focus offset value is proper or not.

In one embodiment of the invention, a predetermined number of FCM signal levels are detected (sampled), and then the sampled FCM signal levels are averaged. Consequently, it is possible to absorb errors in FC signal levels caused due to eccentricity component of the disk.

In another embodiment of the invention, the focus offset value where the two FCM signal levels are minimized in difference is determined as an optimal focus offset value.

In still another embodiment of the invention, in a range where a mean value of FCM signal levels is equal to or greater than a predetermined level, a first shifter shifts (scans) a predetermined amount per time from a current focus offset value toward a maximum reference value, i.e. the focus offset value is incremented in order, each time of which a difference is detected in the above manner. Reaching the maximum reference value, a second shifter scans a predetermined amount per time from the present focus offset value toward a minimum reference value, i.e. the focus offset value is decremented in order, each time of which a difference is detected. Accordingly, an optimal focus offset value is to be determined by a focus offset value at which a difference thereof assumes a minimum of all the differences detected throughout the range.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
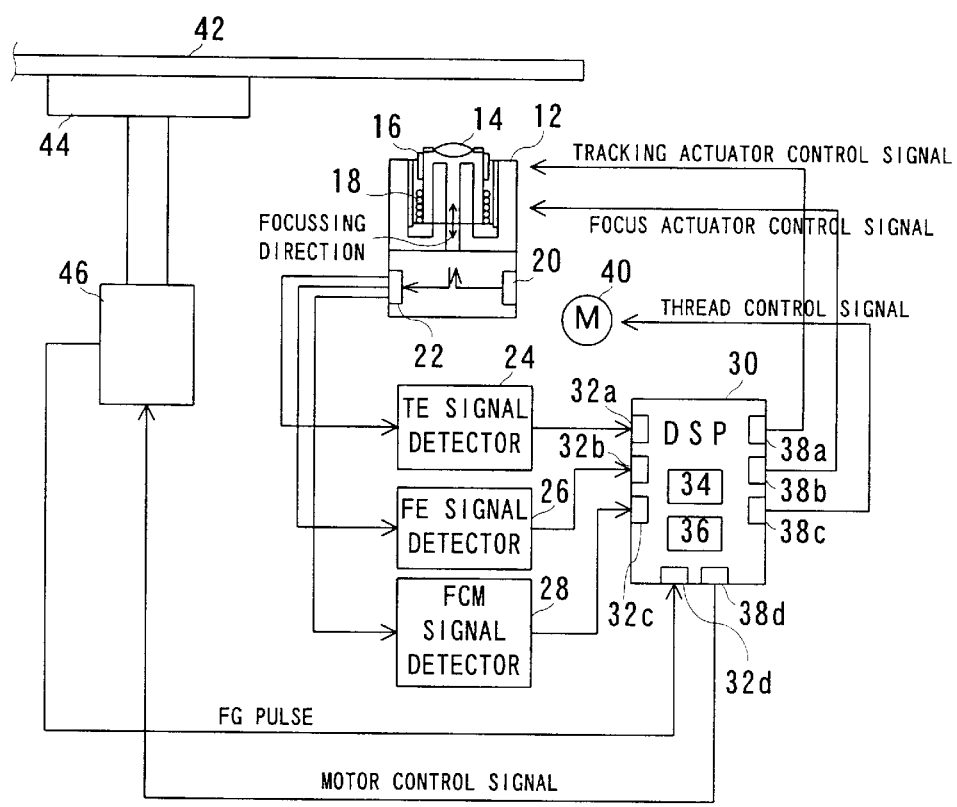
FIG. 1 is an illustrative view showing one embodiment of the present invention.

Referring to FIG. 1, a disk apparatus 10 of this embodiment includes an optical pickup 12. The optical pickup 12 includes an optical lens (objective lens) 14. The optical lens 14 is supported by a tracking actuator 16 and a focus actuator 18. Consequently, the laser light emitted from a laser diode 20 is converged through the objective lens 14 and illuminated onto a reproduce surface of a magnet-optical disk (ASMO disk) 42. Due to this, desired signals are read out of the ASMO disk (later, merely referred to as "MO disk") 42. Note that the MO disk 42 is a disk capable of recording information at lands/grooves. Meanwhile, the optical pickup 12 is coupled to a thread motor 40, e.g. through a lack-and-pinion scheme, thus being allowed to move in a radial direction of the MO disk 42.

The laser light reflected upon the disk surface (reflection light) passes through the same objective lens 14, and then is illuminated onto the photodetector 22. The photodetector 22 has an output to be inputted to the TE signal detector circuit 24 and the FE signal detector circuit 26. In these circuits, a TE signal (Tracking Error signal) and an FE signal (Focus Error signal) are detected. The detected TE and FE signals are respectively supplied to A/D converters 32a and 32b provided in a DSP (Digital Signal Processor) 30. Also, the output of the photodetector 22 is inputted to an FCM signal detector circuit 28 where a fine clock mark signal (FCM signal) is detected. The detected FCM signal is delivered to an A/D converter 32c provided in the DSP 30.

Figure 2:
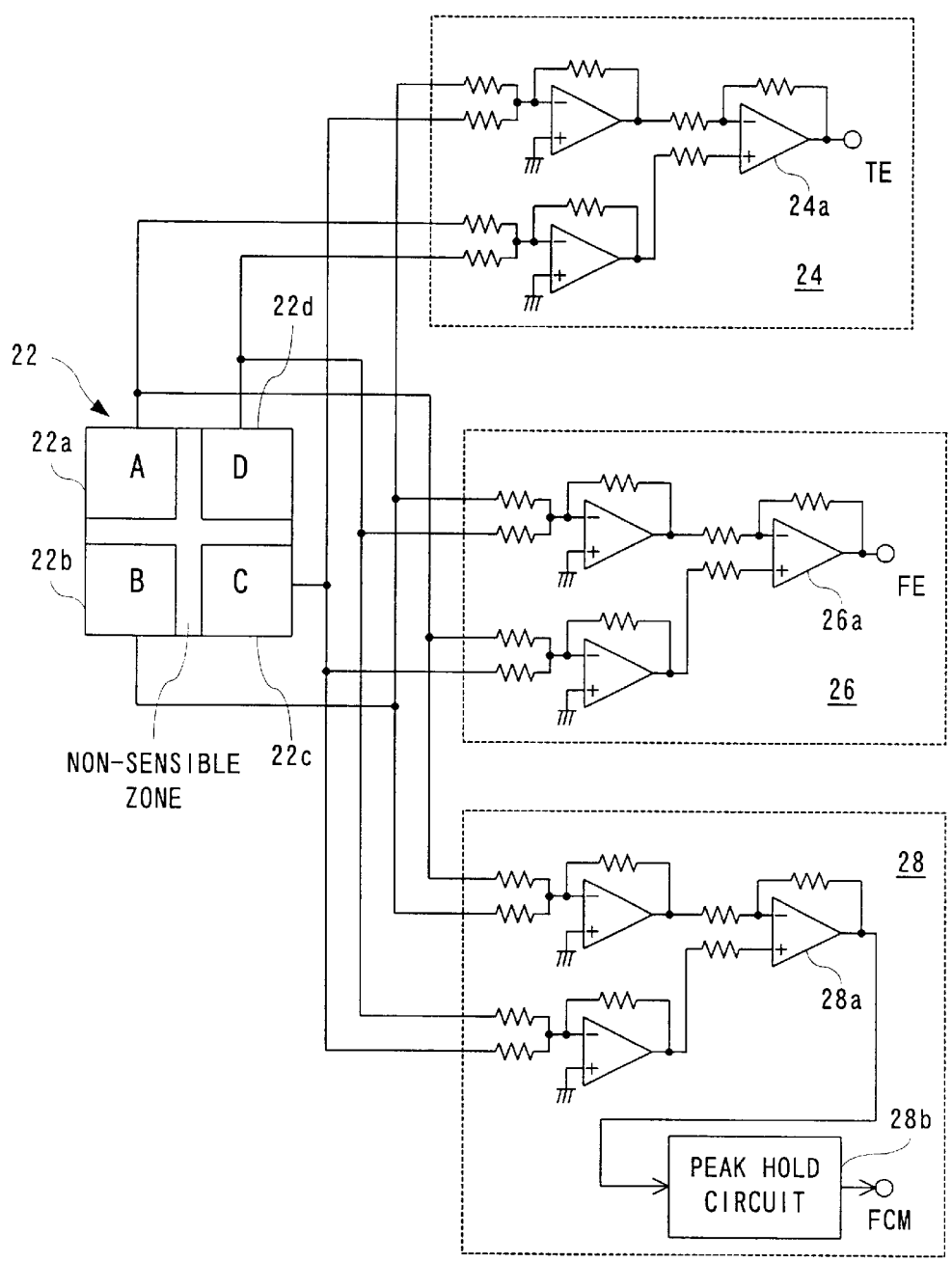
FIG. 2 is an illustrative view showing a photodetector, TE signal detector circuit, FE signal detector circuit and FCM signal detector circuit shown in the FIG. 1 FE signal detector circuit and FCM signal detector circuit shown in the FIG. 1 embodiment.

Explaining more concretely, the photodetector 22, the TE signal detector circuit 24, the FE signal detector circuit 26 and the FCM signal detector circuit 28 are to be represented as in FIG. 2. The photodetector 22 has four regions A–D. These regions A–D are formed by respective photodetector elements 22a–22d. These photodetector elements 22a–22d have outputs to be inputted to the TE signal detector circuit 24, the FE signal detector circuit 26 and the FCM signal detector circuit 28. These circuits perform different arithmetic operations. Consequently, an error amplifier (later, merely referred to as "amplifier") 24a outputs a TE signal, an amplifier 26a outputs an FE signal, and an amplifier 28a outputs an FCM signal. Specifically, the TE, FE and FCM signals are expressed respectively by Equation 1 to Equation 3. Note that, in Equations 1 to 3, the outputs of the photodetectors 22a–22d are denoted by the same reference characters as those of the regions A–D. As can be understood from FIG. 2, the output signal of the amplifier 28a, i.e. the FCM signal, is supplied to a peak hold circuit 28b where maximum and minimum values thereof are held.

[Equation 1]

$$TE=(A+D)-(B+C)$$

[Equation 2]

$$FE=(A+C)-(B+C)$$

[Equation 3]

$$FCM=(A+B)-(C+D)$$

Also, the MO disk 42 is rested on a turntable 44 in a fixed manner, and to be rotated together with the turntable 44 by the spindle motor 46. The spindle motor 46 generates a FG pulse related to rotational velocity. This FG pulse is supplied to an A/D converter 32d of the DSP 30. Incidentally, the MO disk 42 is constant-linear-velocity (CLV) schemed, and the spindle motor 46 has rotational velocity decreasing as the optical pickup moves toward an outer periphery thereof.

The TE, FE, FCM and FG signals thus supplied to the A/D converters 32a–32d are converted into digital signals and then inputted to the DSP core 36. The DSP core 36 carries out tracking servo processing based on the TE signal, focus servo processing based on the FE signal, and spindle servo processing based on the FG signal.

The tracking servo processing produces a tracking actuator control signal and a thread control signal so that the corresponding PWM signals are outputted from PWM driver 39a and 38c to the tracking actuator 16 and thread motor 40. Also, the focus servo processing produces a focus actuator control signal so that the corresponding PWM signal is outputted from a PWM driver 38b to the focus actuator 18. Furthermore, the spindle servo processing produces a spindle servo motor control signal so that the corresponding PWM signal is outputted from a PWM driver 38d to the spindle motor 46.

In this manner, the TE signal detector circuit 24, DSP 30, tracking actuator 16 and thread motor 40 constitute a tracking servo system. Consequently, the objective lens 14 is properly controlled of tracking based on the TE signal. Also, the FE signal detector circuit 26, DSP 32 and focus actuator 18 constitute a focus servo system. Thus, the objective lens 14 is properly controlled of focusing based on the FE signal. Furthermore, the spindle motor 46 and DSP 32 constitute a spindle servo system. The spindle motor 46 and hence the MO disk 42 are properly controlled in rotation based on the FG signal. As a result, the laser light outputted from the laser diode 20 is illuminated with a desired light amount onto a desired track (not shown). Due to this, signals are to be recorded on or read out of the disk surface.

Figure 3:
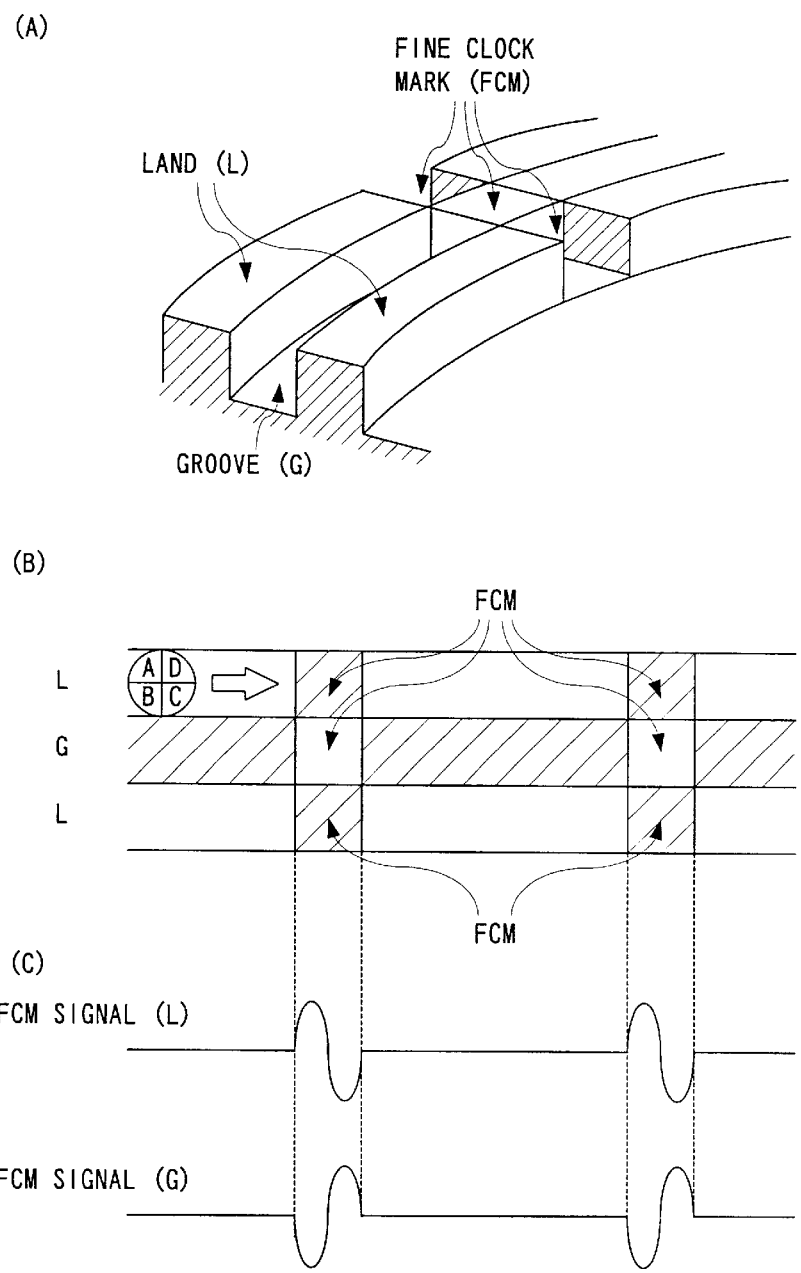
FIG. 3 is an illustrative view showing a typical view depicting one part of the MO disk shown in the FIG. 1 embodiment and FCM signals.

Furthermore, focus balance is adjusted based on the FCM signal. That is, the land (L) and groove (G) have fine clock marks (FCMs) formed physically at a constant interval, as shown in FIGS. 3(A) and 3(B). The FCM is a mark to control rotational velocity or PLL (not shown) of the MO disk 42. FCMs of 1207 in number are formed in each track. The FCM is to be detected by the laser light illuminated from the optical pickup 12. As described before, the output of the photodetector 22 is inputted through the FCM signal detector circuit 28 to the A/D converter 32c. Incidentally, the FCM signal has a differential waveform that is inverted at between the land and the groove, as shown in FIG. 3(C). Also, the maximum and minimum values of the differential waveform are to be held in the peak hold circuit 28b.

In the disk apparatus 10, when turning on power to the apparatus main body or exchanging the MO disk 42, focus balances (focus offset values) are set respectively for the land and groove. That is, optimal offset values are to be set based upon a mean value of the FCM signal levels against a focus offset value (offset value), as shown in FIG. 4.

For example, where the present focus offset balance (FES_OFF_BAL), or a present offset value, is a value corresponding to a point C, detected is a mean value of FCM levels at points A and B deviated by 4 points (in this embodiment, 40 mV in DSP-30 voltage value) left and right (plus and minus) of the offset value with reference to the point C. Thus, a difference of FCM-level mean values is detected for these points A and B. In this manner, the point C is shifted by one point (10 mV) per time between a maximum reference value and a minimum reference value, each time of which a difference of FCM-level mean values is detected. Then, an offset value assuming a minimum is detected from among the detected difference values (i.e. 0 in this embodiment).

Figure 4:
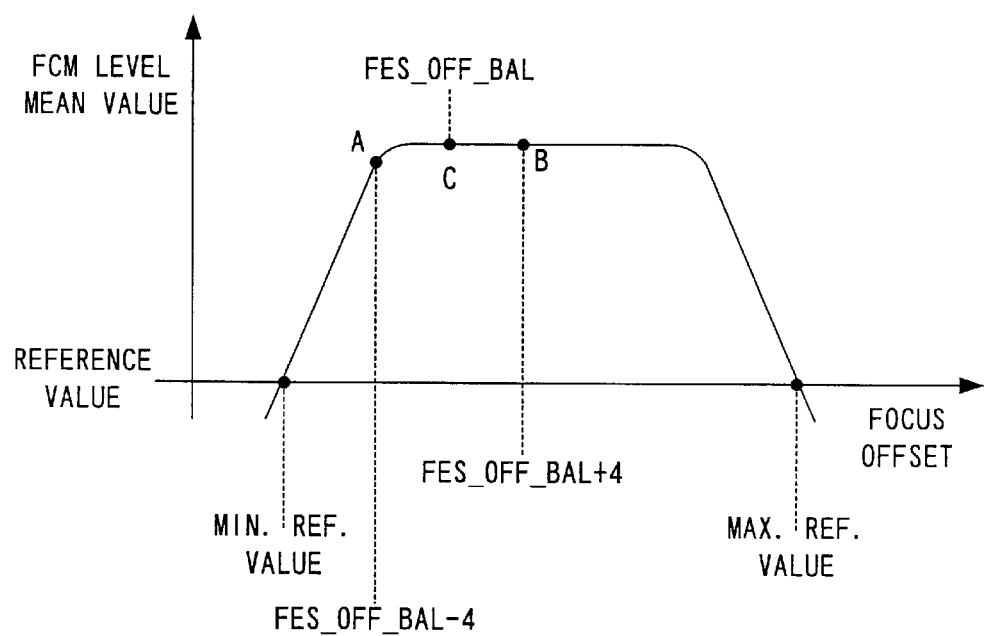
FIG. 4 is an illustrative view showing a focus offset value characteristic with respect to an FCM-level mean value where adjusting focus offset in the disk apparatus of the FIG. 1 embodiment.

As can be understood from FIG. 4, the FCM-signal level against an offset value is in a same level within a predetermined range including an optimal offset value. Accordingly, an optimal offset value (a nearly-center value in the curve line) is obtained by detecting a difference in FCM levels upon shifting the offset value left and right. The offset value is determined (set) for both the land and the groove, and stored in the memory 34. Accordingly, when reproducing information out of an MO disk 42, focus offset is corrected using different offset values for the land and the groove. Incidentally, the reference value, which determines maximum and minimum reference values, is set in such a level that focus servo will not go off.

Specifically, the DSP core 36 processes according to a flowchart shown in FIG. 5 to FIG. 9. When the power to the apparatus main body is turned on or the MO disk 42 is exchanged, the DSP core 36 starts processing. In step S1 the spindle motor 46 is turned on, and in step S3 the laser diode 20 is turned on. Subsequently, in step S5 the focus servo is put on, in step S7 tracking servo is on, and in step S9 thread servo is on. That is, flags are set for focus servo, tracking servo and thread servo. Furthermore, in step S11 laser light is drawn to a track at its land. Consequently, in step S13 focus balance adjustment is made for the land, and in step S15 adjusted optimal focus balance (optimal offset value) is stored in the memory 34.

After setting an offset value for the land, laser light in step S17 is drawn to a track at its groove. In step S19 focus balance adjustment is performed similarly to that of the land. Then, in step S21 an optimal offset value is stored in the memory 34, thus ending the process. Accordingly, the DSP core 36 corrects the FE signals with optical offset values for both the land and the groove, properly applying focus servo. Thus, an optimal reproduced signal is obtained out of the MO disk 42.

Figure 5:
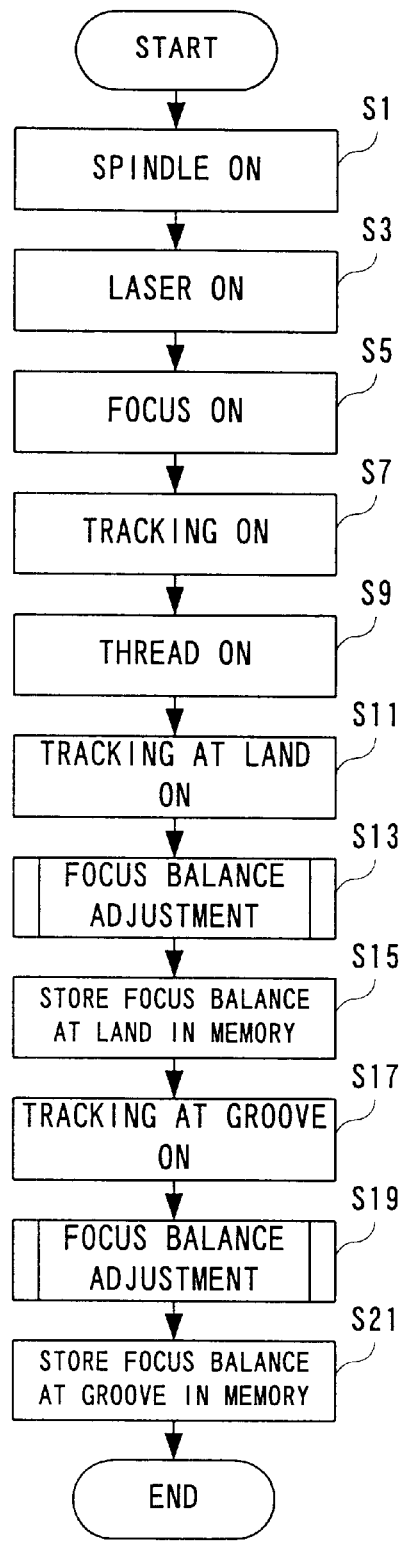
FIG. 5 is a flowchart showing one part of processing of a DSP core of the FIG. 1 embodiment.
Figure 6:
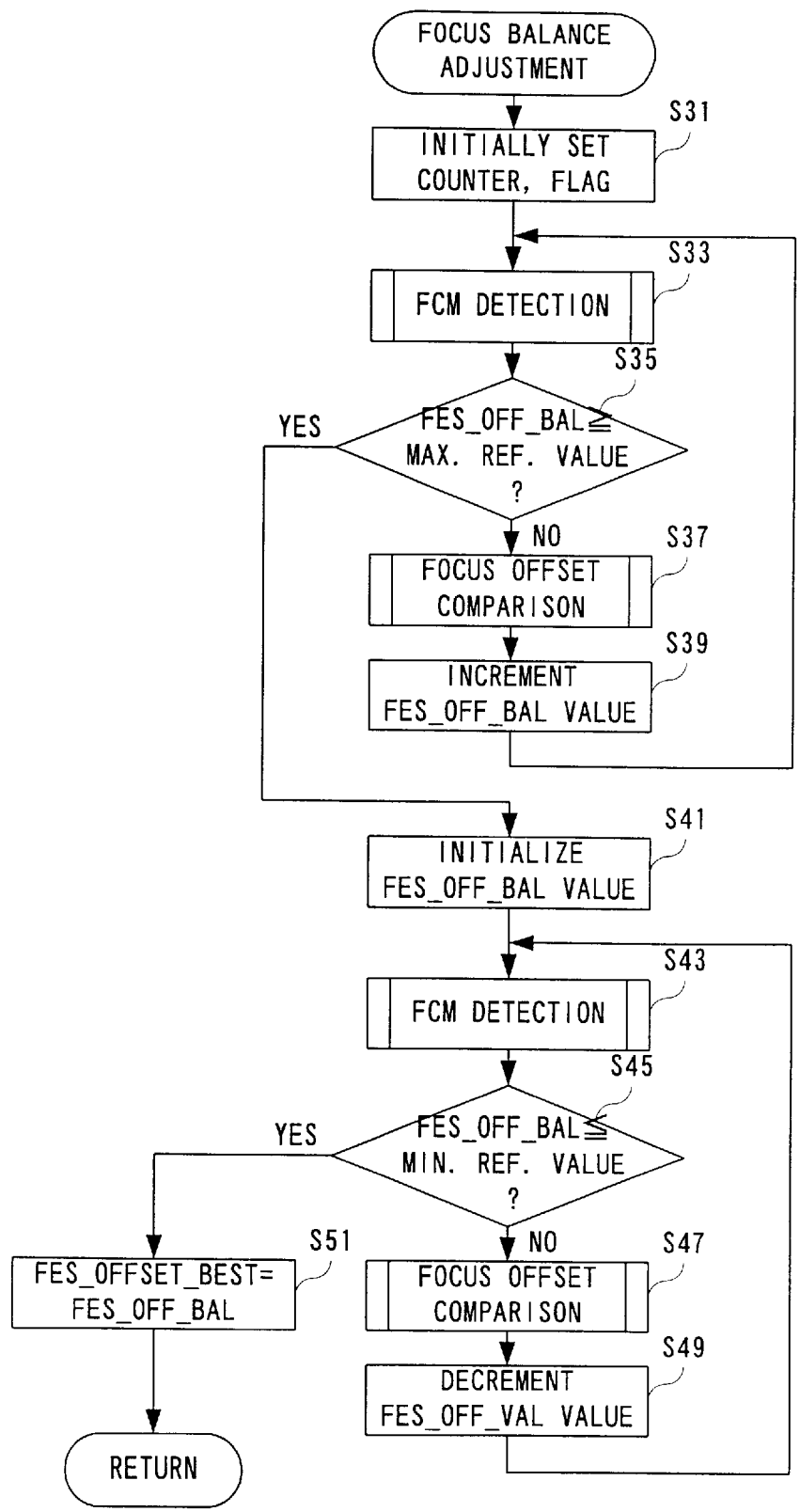
FIG. 6 is a flowchart showing another part of processing of the DSP core of the FIG. 1 embodiment.

Focus balance adjustment is concretely shown in FIG. 6. Incidentally, the steps S13 and S19 of FIG. 5 are same in processing. When starting the focus balance adjustment processing, the DSP core 36 in step S31 initially sets a counter (not shown) and flag. That is, the counter is reset. Also, if the flag is initially set, the processing of setting an optimal offset value is limited in period (time). In the following step S33, FCM detecting processing, stated later, is executed. In step S35, it is determined whether the offset value (FCM_OFF_BAL) is equal to or greater than a maximum reference value or not. If "YES" in step S35, i.e. the offset value is equal to or greater than a maximum reference value, it is determined that scanning has been completed in one direction and the process proceeds to step S41. On the other hand, if "NO" in the step S35, i.e. the offset value is smaller than the maximum reference value, it is determined that the movement (scanning) in the one direction has not been completed. In step S37 focus offset comparing processing is executed, and in step S39 the offset value is incremented (shifted by 1 point (10 mV) in a direction toward the maximum reference value shown in FIG. 4) and then the process returns to the step S33.

After completing the scanning in the one direction, in step S41 the offset value is initialized (reset). In the following step S43, FCM detecting processing is executed, and in step S45 it is determined whether the offset value is smaller than a minimum reference value or not. If "NO" in the step S45, it is determined that the scanning processing in the opposite direction has not been completed, and in step S47 focus offset comparing processing is executed. Then, in step S49 the offset value is decremented (moved by 1 point (10 mV) in a direction toward the minimum reference value in FIG. 4) and then the process returns to the step S43.

On the other hand, if "YES" in the step S45, it is determined that the scanning processing in the opposite direction has ended. In step S51, FES_OFF_BAL is substituted for an optical focus offset balance (optimal offset) FES_OFFSET_BEST)), and the process returns. That is, scanning is made over a range determined by the maximum and minimum reference values. An optimal offset is determined by an offset value in which FCM-level mean values positioned deviated left and right by 4 points from the offset value have a difference assuming a minimum. This offset value is stored in the memory 34. Incidentally, FES_OFF_BAL shown in step S51 is a value obtained from a result of scanning over the range determined by maximum and minimum reference positions.

Figure 7:
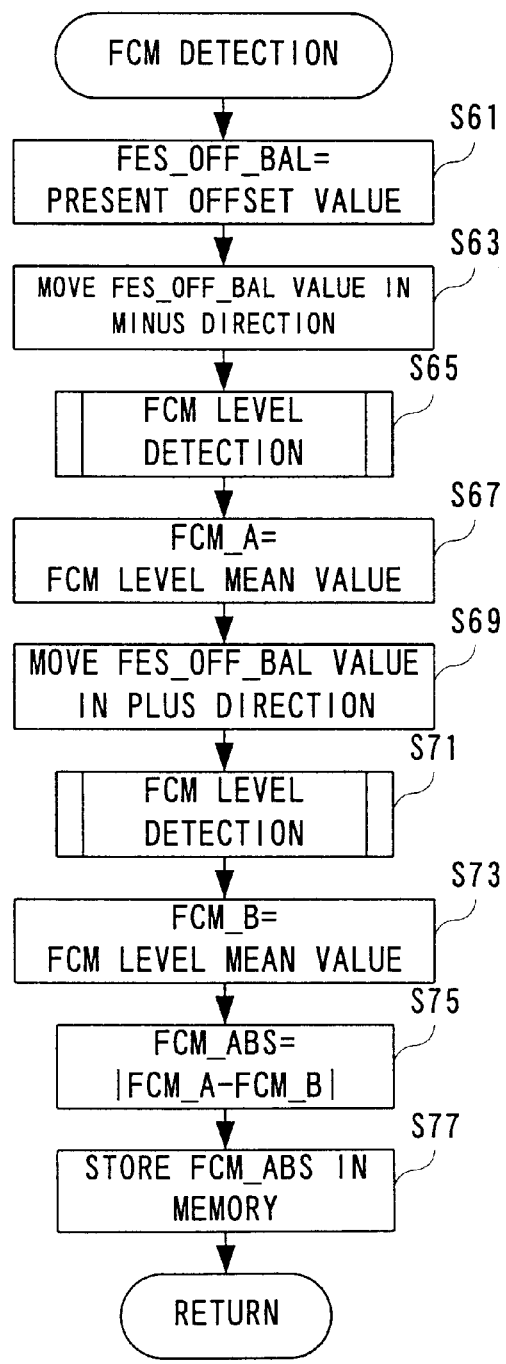
FIG. 7 is a flowchart showing still another part of processing of the DSP core of the FIG. 1 embodiment.

Explanation will now be made concretely on the FCM detecting processing. Note that the FCM detecting processing in the steps S33 and S43 of FIG. 6 are same. As shown in FIG. 7, when FCM processing is started, the DSP core 36 in step S61 reads out of the memory 34 a present offset value corresponding to a land/groove, i.e. an offset value corresponding to the point C of FIG. 4, and substitute it for FES_OFF_BAL. In the following step S63, the offset value is shifted by a predetermined amount (4 points in this embodiment) in a minus direction from the present offset value position. In step S65, FCM-level detecting processing is executed for movement in the minus direction. That is, detected is a mean value in FCM level in the position shifted in the minus direction, i.e. at the point A of FIG. 4, and the FCM-level mean value thus detected is substituted for FCM_A in step S67.

In the following step S69, the offset value is shifted by a predetermined amount (4 points) in the plus direction from the point C. In step S71, FCM-level detecting processing is executed for movement in the plus direction. That is, detected is a mean value in FC level in the position moved in the plus direction, i.e. the point B of FIG. 4. In step S73, the detected FCM-level mean value is substituted for FCM_B. Then, in step S75 an absolute value of subtracting FCM_B from FCM_A is substituted for FCM_ABS, and in step S77 FCM_ABS is stored in the memory 34.

Figure 8:
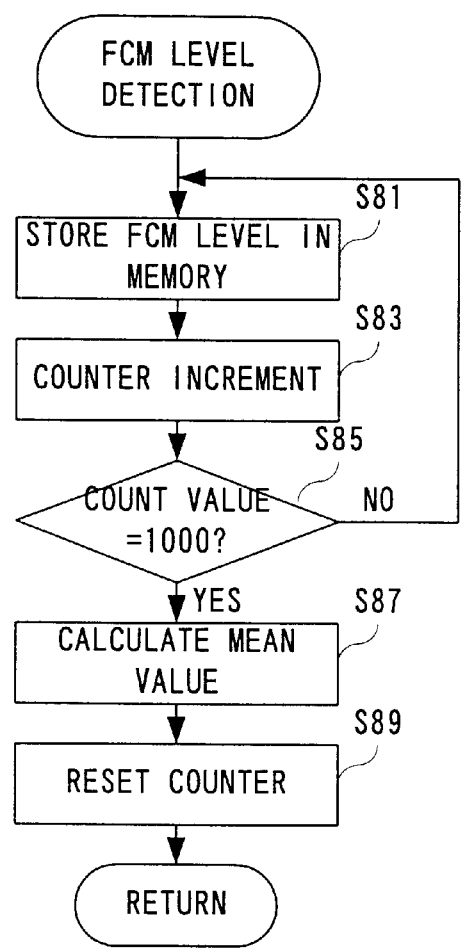
FIG. 8 is a flowchart showing yet another part of processing of the DSP core of the FIG. 1 embodiment.

As shown in FIG. 8, when an FCM level detecting processing is started, in step S81 an FCM level is obtained and stored in the memory 34, and in step S83 the counter is incremented. In this manner, sampling is made on the FCM levels. In the following step S85, it is determined whether a count value is 1000 or not. That is, it is determined whether FCM levels of 1000 in number have been sampled or not. If "NO" in the step S85, it is determined that FCM levels of 1000 in number have not been sampled, and the process returns to the step S81. On the other hand, if "YES" in step S85, it is determined that FCM levels of 1000 in number have been sampled. In step S87, calculated is a mean value of FCM levels of 1000 in number. Then, in step S89 the counter is reset and the process returns. In this manner, it is possible to absorb errors in the FCM levels due to eccentricity or surface reflection of the MO disk 42 by averaging the FCM levels of 1000 in number. Incidentally, because sampling of 1000 in times takes a long time, sampling time may be decreased by reducing the times of sampling, e.g. down to 100.

In this manner, in the FCM detecting processing including the FCM level detecting processing, an offset value is shifted left and right by a predetermined amount per time to calculate mean values of FCM levels a difference of whose absolute value is calculated. Using such absolute difference values, an optimal offset value is detected in focus-offset comparing processing, referred to later. That is, an offset value is detected where the absolute difference value becomes a minimum (=0).

Figure 9:
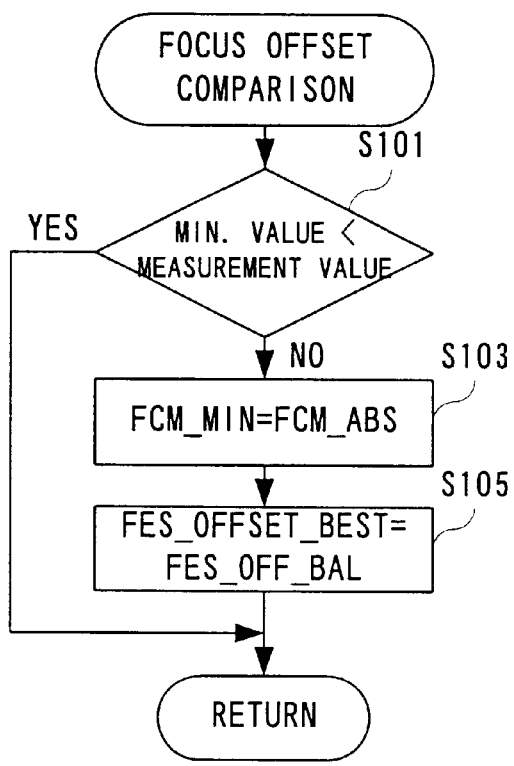
FIG. 9 is a flowchart showing another part of processing of the DSP core of the FIG. 1 embodiment.

As shown in FIG. 9, when focus-offset comparing processing is started, it is determined in step S101 whether a measurement value (FCM_ABS) is greater than a minimum value (=0) or not. If "YES" in step S101, i.e. the measurement value is greater than a minimum value, the process directly returns. On the other hand, if "NO" in the step S101, i.e. the measurement value is smaller than a minimum value, in step S103 FCM_ABS is substituted for FCM_MIN. In step S105, the offset value at that time is substituted for an optimal offset value (FES_OFFSET_BEST) and then the process returns.

That is, in the focus-offset comparing processing, FCM_MIN and FES_OFFSET_BEST are sequentially renewed during scanning over a range determined by maximum and minimum reference values with reference to the present offset value. FCM_MIN upon completing the scanning is a true minimum value. The offset value at this time is an optical offset value.

The respective optimal offset values for the land and groove thus obtained are stored in the memory 34. When reproducing information from the MO disk 42, the offset value is switched in compliance with a track (land/groove) over which the optical pickup 12 follows.

According to this embodiment, optimal offset values can be provided for both the land and the groove by use of FCM signals, thus providing optimal reproduced signals.

In this invention, the FCM levels are averaged and, in accordance therewith, optimal offset values are given respectively for the land and the groove. Meanwhile, it is to be considered to provide optimal offset values respectively for the land and the groove by using reproduced signal from VFO regions, i.e. averaging the reproduced signals from the VFO regions, as in the focus offset adjusting apparatus disclosed in Japanese Patent Laid-open No. H8-7300 [G11B 7/09, G11B 7/007] shown in the prior art. However, VFOs are recorded 25 in number per track. Accordingly, even if a mean value of the reproduced signals from the VFO regions are calculated with DSP, waveform disturbance would occur due to disk eccentricity or surface deflection. That is, it is difficult to provide optimal offset values.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus for reproducing information out of a disk having record at lands/grooves, comprising:

an extractor for illuminating and converging laser light to said disk and extracting fine clock mark signals out of laser light reflected upon said disk; and a setter for setting focus offset values optimal for said land and said groove based on mean values of the fine clock mark signals, wherein said setter further includes a first shifter to shift a present focus offset value by a predetermined amount per time toward a maximum reference value in a range determined by a predetermined level or higher of the mean value, and second shifting means to shift the present focus offset value by a predetermined amount per time toward a minimum reference value in the range.

2. A disk apparatus according to claim 1, wherein said setter includes a detector to detect the mean values where a present focus offset value is shifted left and right by a predetermined value, and a difference detector for detecting a difference of the mean values.

3. A disk apparatus according to claim 2 wherein said detector includes an averager to detect levels of a predetermined number of the fine clock mark signals and average the levels of the predetermined number of the fine clock mark signals.

4. A disk apparatus according to claim 2, wherein said setter further includes a determiner to determine as the optimal focus offset a focus offset value at which the difference becomes minimum.

* * * * *